R. J. LANGER.
BASKET HANDLE.
APPLICATION FILED APR. 28, 1920.
1,371,175.
Patented Mar. 8, 1921.
Fig. 2.
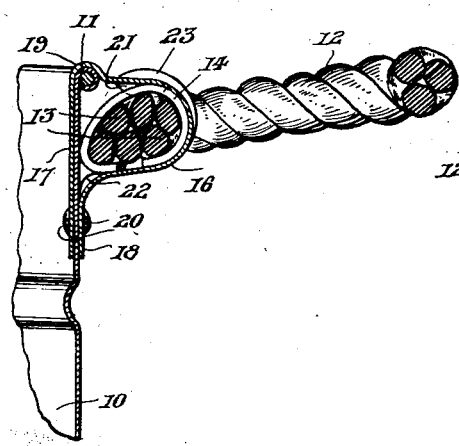
Fig. 1.
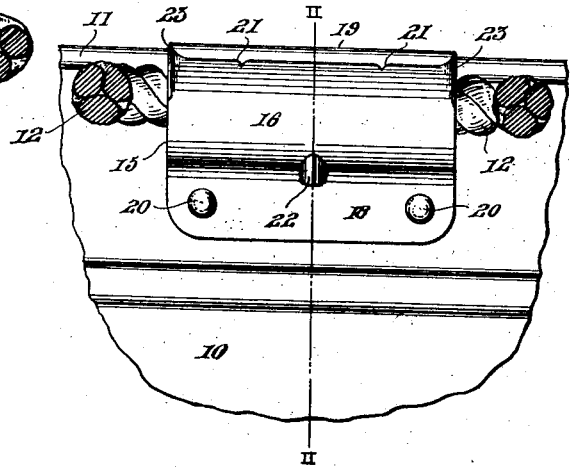
Fig. 3.
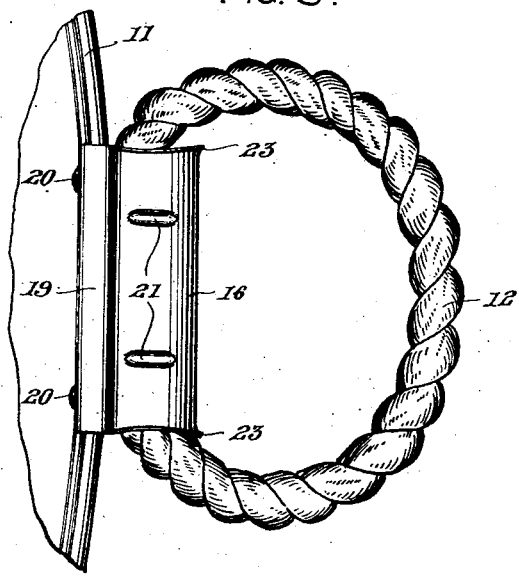
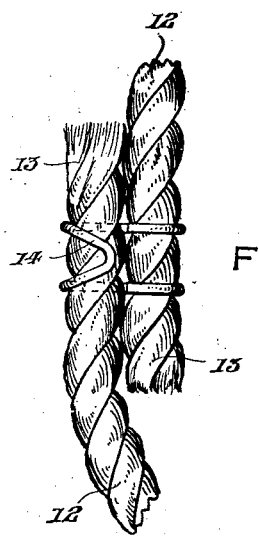
Fig. 4.
Inventor
R. J. Langer
By N. M. Wilson
Attorney

UNITED STATES PATENT OFFICE.

RUDOLPH J. LANGER, OF MONTICELLO, IOWA, ASSIGNOR TO FRANKLIN BARN EQUIPMENT COMPANY, OF MONTICELLO, IOWA.

BASKET-HANDLE.

1,371,175.

Specification of Letters Patent.  Patented Mar. 8, 1921.

Application filed April 28, 1920.  Serial No. 377,285.

*To all whom it may concern:*

Be it known that I, RUDOLPH J. LANGER, a citizen of the United States of America, residing at Monticello, in the county of Jones and State of Iowa, have invented certain new and useful Improvements in Basket-Handles, of which the following is a specification.

The primary object of the invention is the provision of a serviceable handle for baskets, my form of handle being flexible, always positioned ready for being used and prevented from becoming detached from the basket.

A further object of the invention is to provide a basket handle that is comfortable to the hand when grasping the same and while possessing flexibility normally retains its position upon the basket ready for grasping in carrying the same.

A still further object of the invention is the provision of a rope handle for baskets that is easy and inexpensive to manufacture being readily applied to any form of basket for convenience in lifting and carrying the basket, the structure possessing great strength, and providing a handle of finished and neat appearance.

With these general objects in view the invention consists of the novel combination and arrangement of parts hereinafter more fully described, illustrated in the accompanying drawing and then claimed.

In the drawing forming a part of this application, and in which like reference characters designate corresponding parts throughout the several views, Figure 1 is a side elevation of a portion of a basket provided with my invention with the handle broken away, Fig. 2 is a sectional view thereof taken upon line II—II of Fig. 1, Fig. 3 is a top plan view of the same, and Fig. 4 is a view of the overlapped ends of the rope handle secured together for attachment to the basket.

My invention is especially adapted as a serviceable handle for a metal basket commonly made of steel such as 10 having a beaded rim 11 at the open top thereof these baskets being usually termed bushel baskets employed for holding any form of produce such as grain, vegetables or fruit.

My handle broadly comprises a short length of rope 12 having overlapped end portions 13 secured together in any desired manner as by the encircling staple 14 whereby the rope 12 is retained in substantially circular or loop formation.

A metal clip 15 for securing the rope 12 to the outer side of the basket 10 is preferably formed of sheet metal of the same kind as that from which the basket 10 is made being bent to provide a tubular body portion 16 through which the rope 12 extends with terminal plate portions 17 and 18 of the clip 15 embracing the upper edge portion of the basket 10 and positioned forwardly and outwardly thereof respectively.

A longitudinal rib 19 at the top of the body portion 16 overlies the rim 11 of the basket while holdfast devices such as rivets 20 are secured through the plate portions 17 and 18 and the intervening portion of the basket 10 securing the clip 15 to the basket with the handle 12 in its operative position normally ready for grasping by the hand of the user. The overlapped end portions 13 of the rope are positioned within the body portion 16 while indentations or inwardly struck ribs 21 upon the top of the body portion 16 lie at opposite sides of the staple connection 14 preventing longitudinal movement of the rope 12 through the clip 16. An outwardly struck rib 22 in the clip 15 in a plane between the indentations 21 further assist in strengthening the clip as well as maintaining the rope 12 against all turning movements. The overlapped portions 13 of the rope 12 provide a double width for the rope within the clip 15 and the body portion 16 of the latter being substantially oval in form for receiving the connected portions of the rope 12, such overlapped portions are adapted for closely fitting therein and are prevented from both turning and longitudinal movement. The rope 12 possesses considerable body or stability and is maintained open extending outwardly from the side of the basket 10 in suitable position for grasping by the hand by reason of the secured holding of the overlapped portions 13 by the clip 15.

It will be understood that the ribs 21 and 22 strengthen the clip 15 and that any number of such strengthening ribs may be provided which also assist in holding the overlapped rope portions 13. The rope handle 12 normally maintains its open loop formation while the clip 15 is of sufficient strength to prevent the bending of the clip when sustaining a load, upwardly projecting end flanges 23 at the top of the body portion 16 being adapted to strengthen the clip 15 as well as to prevent the edges of the body portion 16 from cutting the rope and also providing a more comfortable handle member for grasping by the hand.

Having thus described my invention, what I claim as new and desire to secure by Letters Patent, is:—

1. A basket handle comprising a rope loop, an attaching clip through which said loop extends and means connected to the rope loop within the clip and non-rotative in the clip adapted for preventing relative slipping and turning of the loop within the clip.

2. A handle for baskets comprising a metal clip adapted for attachment to the basket and having a tubular body portion elongated in cross section, a loop of rope extending through and secured within said body portion and prevented from rotary movement by the tubular body portion.

3. A handle for baskets comprising a metal clip adapted for attachment to the basket and having a tubular body portion, a loop of rope extending through and secured within said body portion against relative rotation and longitudinal shifting, the said clip having a longitudinal bead adapted for overlying the rim of a basket when positioned thereon and further having transverse strengthening ribs adapted for engaging the loop within the clip.

4. A device of the class described comprising a metal clip having a tubular portion, a piece of rope having overlapped ends secured within the tubular portion of the clip and securing means for the overlapped portion of the rope, said securing means and tubular portion being constructed to prevent relative rotary movement.

5. In combination with a basket, a clip overlying the rim thereof with opposite portions inwardly and outwardly of the side of the basket, securing means through the basket and a rope having overlapped portions positioned within the clip and closely engaged thereby whereby the rope is normally maintained in handle formation at an angle to the basket.

6. A flexible handle for baskets providing a metal clip secured to the rim of the basket having a tubular body portion substantially oval in cross section positioned outwardly of the side of the basket, a piece of rope having overlapped end portions closely fitting within said body portion and securing means connected between said end portions.

7. A flexible handle for baskets providing a metal clip secured to the rim of the basket having a tubular body portion substantially oval in cross section positioned outwardly of the side of the basket, a piece of rope having overlapped end portions closely fitting within said body portion, securing means connected between said end portions, whereby the rope is prevented from turning in the clip, the said body portion having substantially opposite ribs positioned in different planes adjacent the overlapped portions of the rope whereby said rope portions are prevented from longitudinal movement within the clip.

8. A flexible handle for baskets providing a metal clip secured to the rim of the basket having a tubular body portion substantially oval in cross section positioned outwardly of the side of the basket, a piece of rope having overlapped end portions closely fitting within said body portions, securing means connected between said end portions, whereby the rope is prevented from turning in the clip, the said body portion having substantially opposite ribs positioned in different planes adjacent the overlapped portions of the rope whereby said rope positions are prevented from longitudinal movement within the clip, forwardly projecting flanges at the ends of the body portion adjacent the rope when in its load-supporting position, the said clip having a longitudinal bead at the top of the body portion adapted for overlying engagement with the rim of the basket.

9. A flexible handle for baskets providing a metal clip secured to the rim of the basket having a tubular body portion substantially oval in cross section positioned outwardly of the side of the basket, a piece of rope having overlapped end portions closely fitting within said body portion, securing means connected between said end portions, upwardly projecting flanges at the ends of the body portion adjacent the rope when in its load-supporting position, the said clip having a longitudinal bead at the top of the body portion adapted for overlying engagement with the rim of the basket.

In testimony whereof I affix my signature.

RUDOLPH J. LANGER.

Witnesses:
  A. H. KOOP,
  H. F. KEBBLITZ.